United States Patent
Arao et al.

(10) Patent No.: US 9,033,592 B2
(45) Date of Patent: May 19, 2015

(54) OPTICAL CONNECTOR MODULE

(71) Applicant: Sumitomo Electric Industries, Ltd., Osaka-shi, Osaka (JP)

(72) Inventors: Hajime Arao, Yokohama (JP); Toshihisa Yokochi, Yokohama (JP); Takayuki Shimazu, Yokohama (JP); Tomoki Sekiguchi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 13/860,776

(22) Filed: Apr. 11, 2013

(65) Prior Publication Data

US 2013/0272664 A1   Oct. 17, 2013

(30) Foreign Application Priority Data

Apr. 13, 2012   (JP) ................................ 2012-091675
Apr. 13, 2012   (JP) ................................ 2012-091677

(51) Int. Cl.
  *G02B 6/36* (2006.01)
  *G02B 6/43* (2006.01)
  *G02B 6/42* (2006.01)

(52) U.S. Cl.
  CPC ............... *G02B 6/43* (2013.01); *G02B 6/4214* (2013.01); *G02B 6/4284* (2013.01)

(58) Field of Classification Search
  CPC ....................................................... G02B 6/43
  USPC .................................................... 385/89, 59
  See application file for complete search history.

(56) References Cited

U.S. PATENT DOCUMENTS

| | | | |
|---|---|---|---|
| 6,203,333 B1 * | 3/2001 | Medina et al. | 439/76.1 |
| 6,219,479 B1 * | 4/2001 | Madden et al. | 385/46 |
| 6,224,269 B1 | 5/2001 | Engstrand et al. | |
| 6,600,860 B2 * | 7/2003 | Sun et al. | 385/115 |
| 6,721,042 B1 * | 4/2004 | Sun et al. | 355/114 |
| 6,744,956 B2 * | 6/2004 | Sun et al. | 385/114 |
| 6,905,257 B2 * | 6/2005 | Eichenberger et al. | 385/89 |
| 7,021,837 B2 * | 4/2006 | Eichenberger et al. | 385/89 |
| 7,065,604 B2 * | 6/2006 | Konda et al. | 710/315 |
| 7,416,347 B2 * | 8/2008 | Livingston et al. | 385/53 |
| 7,548,675 B2 * | 6/2009 | Tatum et al. | 385/100 |
| 8,419,292 B2 * | 4/2013 | Seng | 385/71 |

(Continued)

FOREIGN PATENT DOCUMENTS

| | | |
|---|---|---|
| CN | 1278928 A | 1/2001 |
| EP | 1180708 A2 * | 2/2002 |

(Continued)

OTHER PUBLICATIONS

Office Action in corresponding Chinese Patent Application No. 201310129559X issued on Oct. 10, 2014 (along with its English-language translation).

*Primary Examiner* — Peter Radkowski

(74) *Attorney, Agent, or Firm* — Drinker Biddle & Reath LLP

(57) ABSTRACT

As only either of light emitting side wirings and light receiving side wirings crossover each other, the same connectors 30 may be mounted at opposite ends of an optical fiber. Thus, it is possible to provide an optical connector module at low cost. Further, as the optical fiber is connected straight from one side to the other side, an assembly process is easy.

18 Claims, 11 Drawing Sheets

(56) References Cited

U.S. PATENT DOCUMENTS

| | | | |
|---|---|---|---|
| 2001/0053624 A1* | 12/2001 | Medina et al. | 439/404 |
| 2002/0114590 A1* | 8/2002 | Eichenberger et al. | 385/89 |
| 2002/0126967 A1* | 9/2002 | Panak et al. | 385/101 |
| 2002/0159725 A1* | 10/2002 | Bucklen | 385/101 |
| 2003/0091313 A1* | 5/2003 | Paradiso et al. | 385/135 |
| 2004/0042733 A1* | 3/2004 | Kang et al. | 385/71 |
| 2004/0184741 A1* | 9/2004 | Del Grosso et al. | 385/71 |
| 2005/0213894 A1* | 9/2005 | Su | 385/88 |
| 2006/0067690 A1* | 3/2006 | Tatum et al. | 398/66 |
| 2006/0275007 A1* | 12/2006 | Livingston et al. | 385/134 |
| 2009/0016671 A1* | 1/2009 | Asai et al. | 385/14 |
| 2010/0322554 A1 | 12/2010 | Barnes et al. | |
| 2011/0064369 A1* | 3/2011 | Furuyama et al. | 385/129 |
| 2011/0280528 A1 | 11/2011 | Wu | |
| 2013/0044979 A1* | 2/2013 | Budd et al. | 385/59 |

FOREIGN PATENT DOCUMENTS

| | | | | |
|---|---|---|---|---|
| JP | 10-032545 A | | | 2/1998 |
| JP | 11160542 A | * | | 6/1999 |
| JP | A-H11-160542 | | | 6/1999 |
| JP | 2003101043 A | * | | 4/2003 |
| JP | A-2003-101043 | | | 4/2003 |
| JP | 2003329887 A | * | | 11/2003 |
| JP | A-2003-329887 | | | 11/2003 |
| JP | 201019781 | | * | 9/2010 |
| JP | A-2010-197817 | | | 9/2010 |
| JP | 2011204457 A | * | | 10/2011 |
| JP | A-2011-204457 | | | 10/2011 |

* cited by examiner

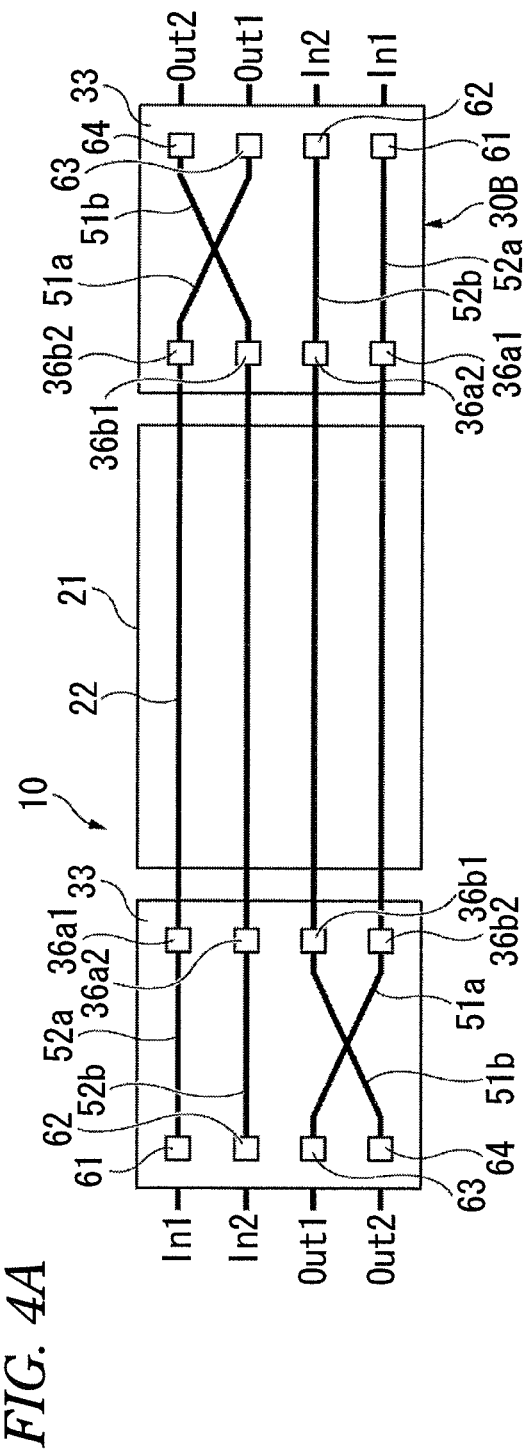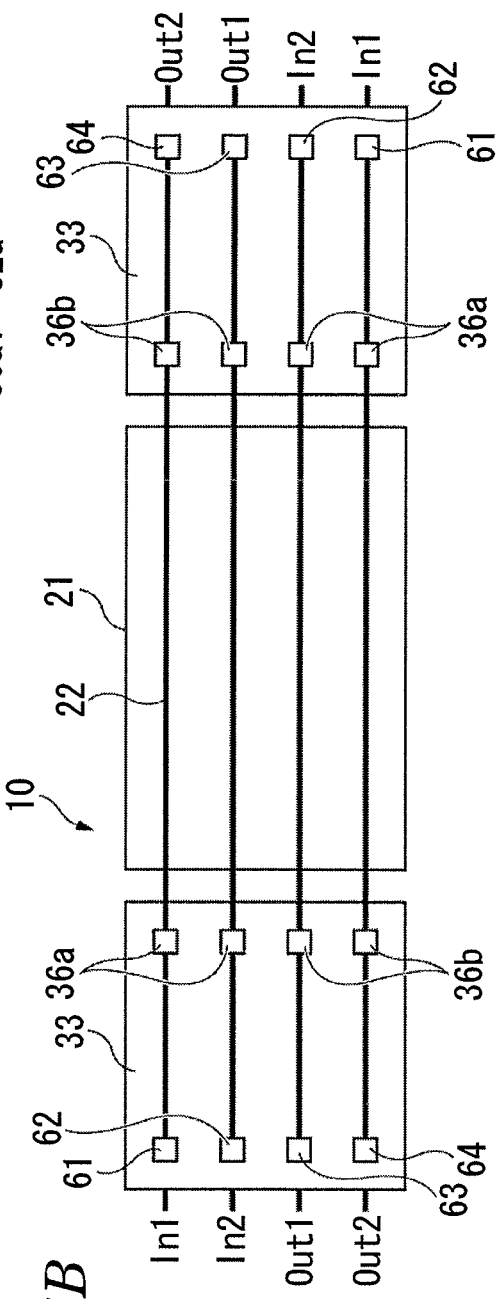

OPTICAL CONNECTOR MODULE

CROSS-REFERENCE TO RELATED APPLICATION(S)

The present application claims the benefit of priorities of Japanese Patent Application No. 2012-091675, filed on Apr. 13, 2012 and Japanese Patent Application No. 2012-091677, filed on Apr. 13, 2012. The disclosures of these applications are incorporated herein by reference.

BACKGROUND

1. Technical Field

The present invention relates to an optical connector module that connects electronic apparatuses by an optical cable.

2. Related Art

A technique has been proposed that provides optical connection between electronic apparatuses in order to enhance a signal transmission speed between the electronic apparatuses. To this end, a technique has been proposed that provides wirings between electronic apparatuses using an optical connector module that converts an electrical signal into an optical signal, as in Patent Document 1, for example. Such an optical connector module includes an optical cable that includes a plurality of optical fibers, and a pair of connectors that mutually converts an optical signal and an electrical signal.

RELATED ART DOCUMENT

Patent Document

[Patent Document 1] JP-A-10-32545

In this regard, in the connector of the optical connector module as described above, a plurality of light receiving and emitting elements is mounted in a line on the same surface of the same substrate. In such an optical connector module, if the same connectors are mounted at opposite ends of the optical cable as such, an arrangement sequence of channels of the connector at one end and an arrangement sequence of channels of the connector at the other end become different. For example, in a case where the channels of the connector at one end are "transmission 1, transmission 2, reception 1 and reception 2", the channels of the connector at the other end are "reception 2, reception 1, transmission 2 and transmission 1". That is, the channels 1 and the channels 2 are reverse to each other. Thus, in the related art, two types of different connectors are prepared and are respectively mounted at one end and the other end of an optical cable. Thus, it is necessary to manufacture connectors having different shapes, which causes increase in manufacturing cost. Further, it is necessary to distinguish two types of connectors to mount the connectors to an optical cable, which complicates an assembly process.

SUMMARY

Exemplary embodiments of the invention provide an optical connector module that is easily assembled at a low manufacturing cost.

According to an aspect of the invention, there is provided an optical connector module including: a pair of connectors including a substrate, a plurality of light emitting elements and a plurality of light receiving elements that are mounted on the substrate, a plurality of light emitting side metal terminals and a plurality of light receiving side metal terminals that are mounted on the substrate and are respectively electrically connected to the light emitting elements and the light receiving elements, a plurality of light emitting side wirings that connects the light emitting elements and the light emitting side metal terminals one to one, and a plurality of light receiving side wirings that connects the light receiving elements and the light receiving side metal terminals one to one; and an optical cable including a plurality of first optical fibers that optically connects the plurality of light emitting elements of one connector and the plurality of light receiving elements of the other connector, and a plurality of second optical fibers that optically connects the plurality of light emitting elements of the other connector and the plurality of light receiving elements of the one connector, wherein a plurality of first signal lines formed by the light emitting side wirings of the one connector, the first optical fibers, and the light receiving side wirings of the other connector crossover each other so that an arrangement sequence of the light emitting side metal terminals corresponding to the plurality of first signal lines and an arrangement sequence of the light receiving side metal terminals corresponding to the plurality of first signal lines are different from each other, and wherein a plurality of second signal lines formed by the light receiving side wirings of the one connector, the second optical fibers, and the light emitting side wirings of the other connector crossover each other so that an arrangement sequence of the light emitting side metal terminals corresponding to the plurality of second signal lines and an arrangement sequence of the light receiving side metal terminals corresponding to the plurality of second signal lines are different from each other.

In the optical connector module according to the aspect of the invention, the plurality of light emitting elements and light receiving elements are mounted in a first arrangement sequence on the same surface of the substrate, in the connectors; either of the plurality of light emitting side metal terminals and the plurality of light receiving side metal terminals corresponding to the first signal lines are mounted in the first arrangement sequence and the other thereof are mounted in a second arrangement sequence different from the first arrangement sequence, and the plurality of light emitting side wirings or the plurality of light receiving side wirings connected to the light emitting side metal terminals or the light receiving side metal terminals mounted in the first arrangement sequence are wired in parallel with each other and the plurality of light emitting side wirings or the plurality of light receiving side wirings connected to the light emitting side metal terminals or the light receiving side metal terminals mounted in the second arrangement sequence are wired to crossover each other; and either of the plurality of light emitting side metal terminals and the plurality of light receiving side metal terminals corresponding to the second signal lines are mounted in the first arrangement sequence and the other thereof are mounted in the second arrangement sequence different from the first arrangement sequence, and the plurality of light emitting side wirings or the plurality of light receiving side wirings connected to the light emitting side metal terminals or the light receiving side metal terminals mounted in the first arrangement sequence are wired in parallel with each other and the plurality of light emitting side wirings or the plurality of light receiving side wirings connected to the light emitting side metal terminals or the light receiving side metal terminals mounted in the second arrangement sequence are wired to crossover each other. In this case, it is preferable that the second arrangement sequence be an arrangement sequence that is reversed to the first arrangement sequence.

In the optical connector module according to the aspect of the invention, the light emitting side metal terminals may be mounted in the second arrangement sequence.

In the optical connector module according to the aspect of the invention, each connector may include: a control circuit configured to perform input and output of an electrical signal output from the light receiving elements and an electrical signal input to the light emitting elements, and a waveform shaping circuit configured to shape the electrical signals input and output in the control circuit; the light emitting side wirings and the light receiving side wirings may include: primary wirings that electrically connect the control circuit and the waveform shaping circuit, and secondary wirings that electrically connect the waveform shaping circuit, and the light emitting side metal terminals and the light receiving side metal terminals; and the primary wirings may crossover each other.

In the optical connector module according to the aspect of the invention, the light emitting side metal terminals and the light receiving side metal terminals may be arranged on different surfaces of the substrate.

In the optical connector module according to the aspect of the invention, the substrate may be a stacked substrate including a plurality of layers, and the light emitting side wirings and the light receiving side wirings may be connected to each other by through-electrodes formed through the layers and may be provided over different layers.

In the optical connector module according to the aspect of the invention, the plurality of first optical fibers and the plurality of second optical fibers are mounted to the substrates of the connectors in the state of being aligned in a line, on one end side and the other end side thereof, and the plurality of first optical fibers and the plurality of second optical fibers are respectively mounted to the connectors in the state of being twisted so that the arrangement sequences are different between the one end side and the other end side thereof. In this case, it is preferable that the plurality of first optical fibers and the plurality of second optical fibers be respectively mounted to the connectors in the state of being twisted so that the arrangement sequences are reversed between the one end side and the other end side.

In the optical connector module according to the aspect of the invention, both of the plurality of first optical fibers and the plurality of second optical fibers may be twisted on the one end side or may be twisted at different locations on the one end side and the other end side.

In the optical connector module according to the aspect of the invention, the plurality of first optical fibers and the plurality of second optical fibers may be accommodated in the optical cable in the state of being aligned with a first pitch in a predetermined direction and may be fixed to the substrates of the connectors in the state of being aligned with a second pitch wider than the first pitch in the predetermined direction; the plurality of first optical fibers and the plurality of second optical fibers twisted so that the arrangement sequences are reversed may be fixed to the substrates of the connectors in a state where a first optical fiber and a second optical fiber positioned at the outermost positions in a region where the optical fibers are aligned with the first pitch are twisted inward; and the first optical fiber and the second optical fiber positioned at the outermost positions in the region where the optical fibers are aligned with the first pitch may have a bending portion formed in a direction perpendicular to the predetermined direction when extending over a first optical fiber and a second optical fiber positioned on the inside.

In the optical connector module according to the aspect of the invention, the region where the optical fibers are aligned with the first pitch and a region where the optical fibers are aligned with the second pitch may be offset in the direction perpendicular to the predetermined direction and the bending portion may be formed in the offset direction.

Advantage of the Invention

According to the optical connector module of the invention, either of the plurality of light emitting side wirings and the plurality of light receiving side wirings are wired in the first arrangement sequence and the other thereof are wired in the second arrangement sequence, and either of the plurality of light emitting side wirings and the plurality of light receiving side wirings are wired in parallel and the other thereof are wired to crossover each other. Thus, the orders of a plurality of channels match with each other at opposite ends of the optical connector module, and it is thus possible to mount the same connectors at opposite ends of the optical cable. Thus, it is possible to provide an optical connector module at low cost. Further, it is possible to connect the optical fibers from one side to the other side as such without crossover. As the plurality of optical fibers is regularly connected, an assembly process becomes easy.

According to the optical connector module of the invention, as the plurality of first optical fibers and the plurality of second optical fibers are respectively twisted between one end side and the other end side so that the arrangement sequences are reversed, the arrangement sequences are reversed between one end side and the other end side. Accordingly, it is possible to use the same connector substrates at the opposite ends of the optical cable, thereby reducing the manufacturing cost. Further, it is possible to adjust the arrangement sequences of the channels at one end and the other end, using a simple method in which the optical fibers are twisted to be reversed. Thus, it is possible to easily perform assembly of the optical connector module and to reduce the manufacturing cost.

BRIEF DESCRIPTION OF THE DRAWINGS

FIG. 4A is a diagram illustrating a signal path of the optical connector module according to the embodiment of the invention, and FIG. 4B is a diagram illustrating a signal path of an optical connector module according to a reference example.

DETAILED DESCRIPTION (First Embodiment)

Figure 1A:
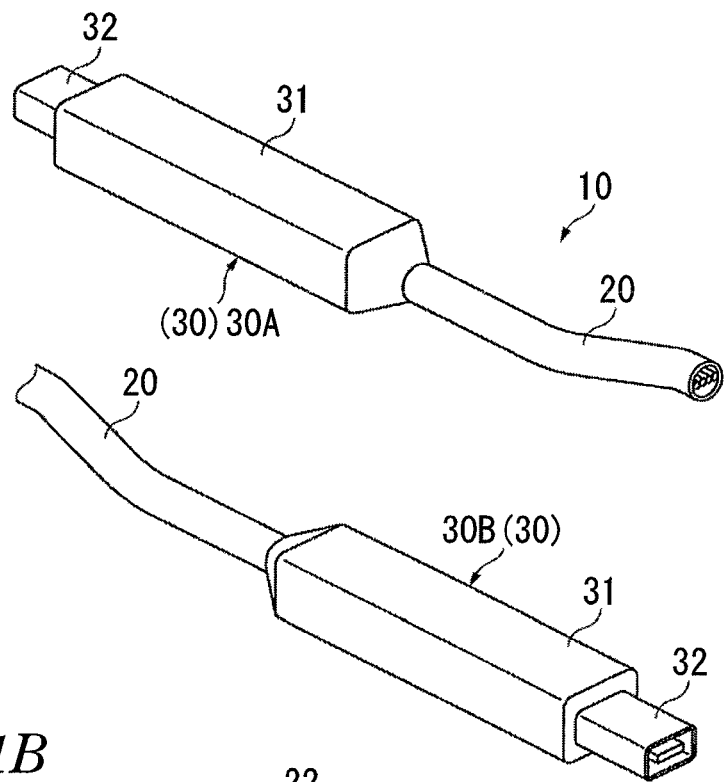
FIG. 1A is a perspective view illustrating an entire optical connector module according to a first embodiment of the invention.

Hereinafter, an optical connector module of a first embodiment according to the invention will be described with reference to the accompanying drawings. FIG. 1A is a perspective view illustrating an entire optical connector module 10 according to the first embodiment of the invention, and FIG. 1B is a cross-sectional view illustrating an optical cable 20.

As shown in FIG. 1A, the optical connector module 10 according to the present embodiment includes the optical cable 20, and connectors 30A and 30B that are respectively mounted to one end side and the other end side of the optical cable 20.

The optical connector module 10 may be used for signal (data) transmission. For example, the optical connector module 10 is electrically connected to an electronic apparatus such as a personal computer or a monitor that is a connection target, converts an input/output electrical signal into an optical signal, and mutually transmits the optical signal between one end side and the other end side thereof at high speed. In the following description, the connectors 30A and 30B are simply referred to as a connector 30, except for a case where one end side and the other end side are particularly distinguished.

Figure 1B:
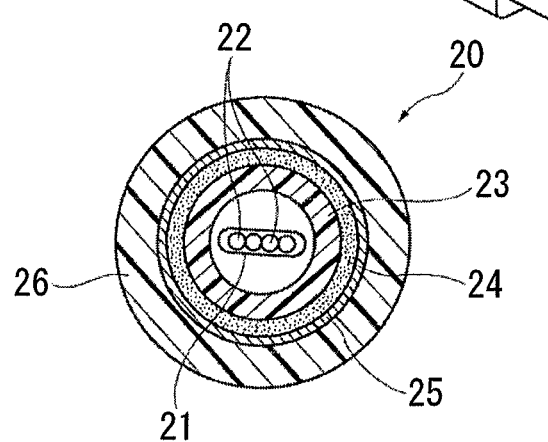
FIG. 1B is a cross-sectional view illustrating an optical cable.

As shown in FIG. 1B, the optical cable 20 includes an optical fiber ribbon 21 at the center thereof when seen in a transverse section. The optical fiber ribbon 21 is integrated by arranging in parallel a plurality of (here, four) coated optical fibers (which are simply referred to as optical fibers) 22 in a plane and bundling the optical fibers 22 in a tape shape by a coating resin. In this way, it is preferable that the plurality of optical fibers accommodated in the optical cable 20 be bundled and integrated in a tape shape so that the arrangement is regulated with predetermined arrangement and pitch. The optical fiber ribbon 21 is accommodated inside an inner tube 23.

An interposing layer 24 is formed by the bundle of tensile strength fibers and is provided around the inner tube 23. A metal layer 25 that is formed by a plurality of metal element wires is provided around the interposing layer 24. A jacket 26 that is formed of an insulating resin is provided around the metal layer 25.

As shown in FIG. 1A, the connector 30 includes a housing 31, and an electrical input and output section 32 provided on a tip end side (side opposite to the optical cable 20) of the housing 31. The electric input and output section 32 is connected to an external apparatus (personal computer or the like) and inputs and outputs an electrical signal between the external apparatus and the optical connector module 10. The electric input and output section 32 is provided to protrude from a tip end portion of the housing 31 to the tip end side.

Figure 2:
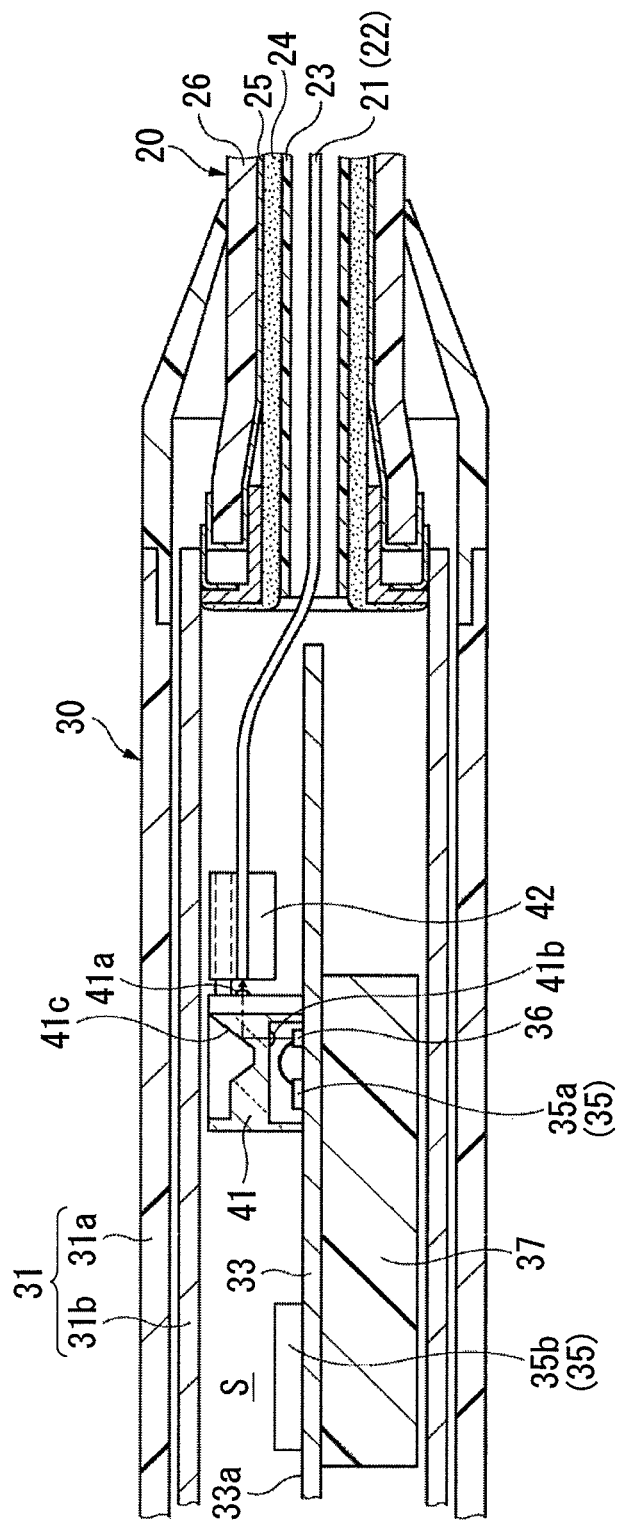
FIG. 2 is a cross-sectional view illustrating the inside of a connector.

FIG. 2 is a cross-sectional view illustrating the inside of the connector 30. As shown in FIG. 2, the connector 30 includes a connector substrate 33 accommodated in the housing 31. The housing 31 includes a resin housing 31a of a rectangular cross section on the outside, and a metal housing 31b of a rectangular cross section inside the resin housing 31a. In an inner space S of the metal housing 31b, the connector substrate 33 is accommodated. The connector substrate 33 is mounted to the metal housing 31b through a heat dissipation sheet 37.

Figure 3:
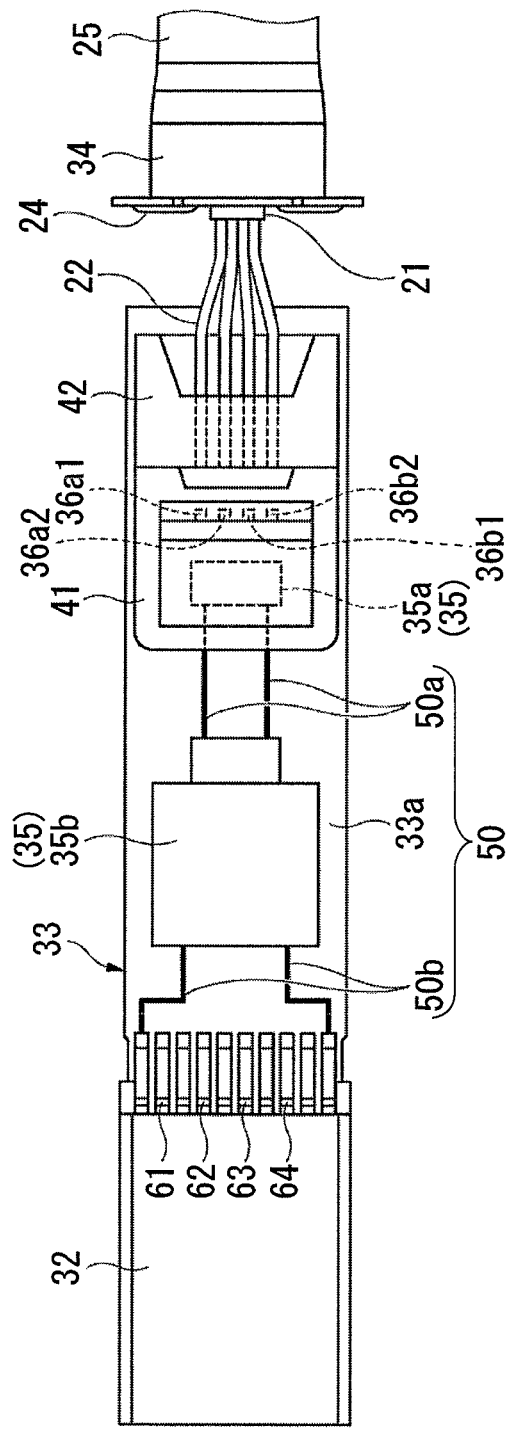
FIG. 3 is a plan view illustrating a connector substrate accommodated in the connector.

FIG. 3 is a plan view illustrating the connector substrate 33. A control semiconductor 35, light emitting elements 36a1 and 36a2 that generate an optical signal according to an electrical signal, and light receiving elements 36b1 and 36b2 that generate an electrical signal according to an optical signal are mounted on a mounting surface 33a of the connector substrate 33. In the following description, the light emitting elements 36a1 and 36a2 and the light receiving elements 36b1 and 36b2 are simply referred to as light receiving and emitting elements 36 in a case where they are not particularly distinguished.

The light receiving and emitting elements 36 include a plurality of (here, two) light emitting elements 36a1 and 36a2, and a plurality of (here, two) light receiving elements 36b1 and 36b2. The light emitting elements 36a1 and 36a2 and the light receiving elements 36b1 and 36b2 are arranged in a line on the side of the optical cable 20 on the mounting surface 33a in the connector substrate 33. Further, two light emitting elements 36a1 and 36a2 are provided on an upper side of the mounting surface 33a in FIG. 3, and two light receiving elements 36b1 and 36b2 are provided on a lower side of the mounting surface 33a in FIG. 3.

As the light emitting elements 36a1 and 36a2, for example, a light emitting diode (LED), a laser diode (LD), a vertical cavity surface emitting laser (VCSEL) or the like may be used. As the light receiving elements 36b1 and 36b2, for example, a photo diode (PD) or the like may be used.

The control semiconductor 35 includes a control circuit 35a in which a drive IC (Integrated Circuit) that drives the light emitting elements 36a1 and 36a2 and a TIA (Transimpedance Amplifier) that amplifies output electric current of the light receiving elements 36b1 and 36b2 are packaged, a CDR (Clock Data Recovery) apparatus 35b that is a waveform shaper, and the like.

The electric input and output section 32 is provided to a side of the connector 30 opposite to a side to which the optical cable 20 is connected. The electric input and output section 32 includes a plurality of metal terminals 61, 62, 63 and 64. These metal terminals 61 to 64 are soldered to a tip end side of the connector substrate 33. Among the plurality of metal terminals 61, 62, 63 and 64, the light emitting side metal terminals 61 and 62 are electrically connected to the light emitting elements 36a1 and 36a2, and the metal terminals 63 and 64 on the light receiving side are electrically connected to the light receiving elements 36b1 and 36b2.

A wiring 50 that electrically connects the light receiving and emitting elements 36 and the electric input and output section 32 is formed on the mounting surface 33a of the connector substrate 33. More specifically, as the wiring 50, primary wirings 50a that connect the control circuit 35a and the CDR apparatus 35b, and secondary wirings 50b that connect the CDR apparatus 35b and the metal terminals 61 to 64 are formed.

As shown in FIGS. 2 and 3, the light receiving and emitting elements 36 are optically connected to the optical fibers 22 of the optical cable 20 through a lens array component 41. The lens array component 41 is arranged on the mounting surface 33a of the connector substrate 33 to cover the light receiving and emitting elements 36 and the control circuit 35a. As described above, since the plurality of light receiving and emitting elements 36 is formed on the same mounting surface 33a of the single connector substrate 33, it is possible to optically couple the plurality of light receiving and emitting elements 36 and the plurality of optical fibers 22 in a bundle only by mounting the single lens array component 41.

The lens array component 41 is a member made of a transparent resin. As shown in FIG. 2, the lens array component 41 includes a plurality of fiber side lens sections 41a that faces end surfaces of the optical fibers 22 exposed from a fiber support section 42, a plurality of element side lens sections 41b that faces the light receiving and emitting elements 36, and a reflection surface 41c that optically connects the fiber side lens sections 41a and the element side lens sections 41b. The plurality of fiber side lens sections 41a and the element side lens sections 41b are arranged in an array form along the width direction of the lens array component 41. Further, the reflection surface 41c is formed along the width direction on an upper surface of the lens array component 41.

Light emitted from the light emitting elements 36a1 and 36a2 is incident onto the element side lens sections 41b, is reflected by the reflection surface 41c, and is optically coupled to the optical fibers 22 by the fiber side lens sections 41a. Further, the light output from the end surfaces of the optical fibers 22 is incident onto the lens array component 41 from the corresponding fiber side lens sections 41 a, is reflected by the reflection surface 41c, and is optically coupled to the light receiving elements 36b1 and 36b2 by the element side lens sections 41b. In this way, the plurality of optical fibers 22 and the light receiving and emitting elements 36 are optically connected to each other through the lens array component 41.

The fiber support section 42 supports the optical fibers 22 exposed from an end portion of the optical cable 20, and optically connects the optical fibers 22 and the lens array component 41. In the fiber support section 42, the optical fibers 22 are supported in the state of being separated into single wires from the optical fiber ribbon 21 and being aligned in a line. As the fiber support section 42 is installed to the connector substrate 33, the optical fibers 22 are installed to the connector substrate 33 in the state of being aligned in a line.

The plurality of optical fibers 22 is accommodated in the optical cable 20 in the state of being arranged with a first pitch (for example, 125 μm pitch) in a predetermined direction. These optical fibers 22 are aligned in a line in the state of being extended with a second pitch larger than the first pitch in the fiber support section 42, and are fixed to the connector substrate 33. In other words, the pitch of the plurality of optical fibers 22 is converted in the fiber support section 42. Thus, the mounting positions of the plurality of optical fibers 22 are adjusted corresponding to the positions of the respective lens sections 41a and 41b of the lens array component 41 formed according to the arrangement of the light receiving and emitting elements 36.

The second pitch of the plurality of optical fibers 22 should not necessarily be uniform. That is, the second pitch is set according to the pitch of the light receiving and emitting elements 36 arranged with a pitch larger than the first pitch and the respective lens sections 41a and 41b of the lens array section 41.

In the present embodiment, the interval between the light emitting elements 36a1 and 36a2 that are arranged in a line is also set to 250 μm, the interval between the light receiving elements 36b1 and 36b2 is set to 250 μm, and the interval between the light emitting element 36a2 and the light receiving element 36b1 is set to 375 μm. Accordingly, the second pitch between the optical fibers 22a and 22b (see FIG. 4) is set to 250 μm, the second pitch between the optical fibers 22b and 22c is set to 375 μm, and the second pitch between the optical fibers 22c and 22d is set to 250 μm. On the other hand, the first pitch of the optical fibers 22a to 22d is set to 125 μm that is smaller than the second pitch.

A through-hole that has a diameter equal to or slightly larger than that of the optical fiber 22 is provided in the fiber support section 42, and the optical fiber core 22 is inserted into the through-hole and is fixed thereto. The fiber support section 42 is positioned with respect to the lens array component 41 so that the end surface of the optical fiber 22 directly faces the fiber side lens section 41a.

Further, at opposite ends of the optical cable 20, the jacket 26 is removed. Further, the interposing layer 24 and the metal layer 25 that are peeled so that the optical fiber ribbon 21 is exposed are fixed to a fixing section 34 provided in the connector 30, and thus, the optical cable 20 is fixed to the connector 30.

Further, in the optical connector module 10 according to the present embodiment, as shown in FIG. 2, with respect to the position of the optical fiber 22 in the end portion of the optical cable 20 fixed to the housing 31, the position of the optical fiber 22 held by the fiber support section 42 is offset in a direction orthogonal to the arrangement surface of the optical fiber 22. That is, in the example of FIG. 2, the position of the optical fiber 22 in the end portion of the optical cable 20 arranged with the first pitch is offset to the side of the connector substrate 33 compared with the position of the optical fiber 22 held by the fiber support section 42, arranged with the second pitch. Thus, the optical fiber 22 is disposed in the state of being bent from the end portion of the optical cable 20 to the fiber support section 42 in the inner space S.

Thus, for example, if an electrical signal is input from the electrical input and output section 32, the electrical signal is input to the light emitting elements 36a1 and 36a2 through the CDR apparatus 35b and the control circuit 35a from the metal terminals 61 and 62 on the light emitting side, and the light emitting element 36 transmits an optical signal to the optical fiber 22 according to the electrical signal. Contrarily, if an optical signal is input from the optical fiber 22, the light receiving elements 36b1 and 36b2 generate an electrical signal according to the optical signal, and the electrical signal is input to the light receiving side metal terminals 63 and 64 through the control circuit 35a and the CDR apparatus 35b and is output from the electrical input and output section 32.

FIGS. 4A and 4B are diagrams schematically illustrating a signal path of an optical connector module, in which FIG. 4A shows a signal path of the optical connector module 10 according to the present embodiment, and FIG. 4B shows a signal path of an optical connector module according to a reference example. Hereinafter, as shown in FIGS. 4A and 4B, a case where terminals of an external apparatus connected to the optical connector module 10 are arranged as a first input terminal In1, a second input terminal In2, a first output terminal Out1 and a second output terminal Out2 from the right side when seen from the optical connector module 10 will be described as an example.

First, connectors of an external apparatus connected to one end and the other end of the optical connector module 10 are designed under the same standard, and the respective connectors are formed in the same shape. Accordingly, arrangement of the terminals of the connector of the external apparatus is reversed at opposite ends of the optical connector module 10. That is, in the case of the example in the figure, the first input terminal In1 the second input terminal In2, the first output terminal Out1 and the second output terminal Out2 are sequentially arranged from the top on one end side, and the second output terminal Out2, the first output terminal Out1, the second input terminal In2, and the first input terminal In1 are sequentially arranged from the top on the other end side. Further, a signal from the first input terminal In1 is set to be transmitted to the first output terminal Out1, and a signal from the second input terminal In2 is set to be transmitted to the second output terminal Out2.

Further, since the same connector is used at the opposite ends in the connector 30 of the optical connector module 10, in the example in the figure, in the connector 30A on one end side, the light emitting elements 36a1 and 36a2 (first arrangement sequence) are formed in an upper region on the mounting surface 33a of the connector substrate 33, and the light receiving elements 36b1 and 36b2 (first arrangement sequence) are formed in a lower region thereof. Further, in the connector 30B on the other end side, the light emitting elements 36a1 and 36a2 (first arrangement sequence) are formed in a lower region on the mounting surface 33a, and the light receiving elements 36b1 and 36b2 (first arrangement sequence) are formed in an upper region thereof. Further, the light emitting side input terminals 61 and 62 that are connected to the first input terminal In1 and the second input terminal In2, and the light receiving side metal terminals 63 and 64 that are connected to the first output terminal Out1 and the second output terminal Out2 are respectively formed on the same surface of the connector substrate 33 of the connector 30.

In the optical cable 20 used in the optical connector module 10, the plurality of optical fibers 22 is arranged in parallel. Thus, if the light receiving and emitting elements 36 and the metal terminals 61 to 64 are all connected to each other in parallel by wirings provided on the connector substrate 33, as shown in FIG. 4B, a signal of the first input terminal In1 on one end side is output to the second output terminal Out2 on the other end side, and a signal of the second input terminal In2 on one end side is output to the first output terminal Out1 on the other end side. That is, the signal from the first input terminal In1 is not transmitted to the first output terminal Out1.

Thus, in the present embodiment, as shown in FIG. 4A, in the connector substrate 33 at the opposite ends, two light receiving side wirings 51a and 51b that connect the output terminals Out1 and Out2 to the light receiving elements 36b1 and 36b2 crossover each other. More specifically, the light receiving side wiring 51a that connects the light receiving side metal terminal 63 connected to the first output terminal Out1 and the light receiving element 36b2, and the light receiving side wiring 51b that connects the light receiving side metal terminal 64 connected to the second output terminal Out2 and the light receiving element 36b1 are reversed by 180° when seen from the connection direction to intersect with each other. That is, the plurality of light receiving elements 36b1 and 36b2 that is mounted on the same surface of the substrate in the first arrangement sequence is electrically connected to the light receiving side metal terminals 63 and 64 that are mounted in the second arrangement sequence that is reversed to the first arrangement sequence, through the plurality of light receiving side wirings 51a and 51b that are wired to crossover each other.

On the other hand, in the connector substrate 33 at the opposite ends, two light emitting side wirings 52a and 52b that connect the input terminals In1 and In2 and the light emitting elements 36a1 and 36a2 are connected in parallel as such without crossover. More specifically, the light emitting side wiring 52a that connects the metal terminal 61 connected to the first input terminal In1 and the light emitting element 36a1, and the light emitting side wiring 52b that connects the metal terminal 62 connected to the second input terminal In2 and the light emitting element 36a2 extend in parallel and do not crossover each other. That is, the plurality of light emitting elements 36a1 and 36a2 that is mounted in the first arrangement sequence on the same surface of the substrate is electrically connected to the light emitting side metal terminals 61 and 62 that are mounted in the first arrangement sequence, through the plurality of light emitting side wirings 52a and 52b that is wired in parallel.

Here, the first arrangement sequence represents a case where channels 1 and 2 are arranged from the left to the right when the optical cable 20 is seen from one connector substrate 33. Further, the second arrangement sequence represents a case where the channels 1 and 2 are arranged from the right to the left when the optical cable 20 is seen from one connector substrate 33. That is, in FIGS. 4A and 4B, the light emitting side metal terminal 61 that receives an input of a signal of the channel 1 and the light emitting side metal terminal 62 that receives an input of a signal of the channel 2 are arranged in the order of the light emitting side metal terminal 61 and the light emitting side metal terminal 62 from the left to the right when the optical cable 20 is seen from one connector substrate 33. Further, in FIGS. 4A and 4B, the light receiving side metal terminal 63 from which the signal of the channel 1 is output and the light receiving side metal terminal 64 from which the signal of the channel 2 is output are arranged in the order of the light receiving side metal terminal 64 and the light receiving side metal terminal 63 from the left to the right when the optical cable 20 is seen from one connector substrate 33.

In this way, in the optical connector module 10 according to the present embodiment, with respect to the wirings on the connector substrate 33, the light emitting side wirings 52a and 52b are connected in parallel as such, and the light receiving side wirings 51a and 51b are connected in the state of being reversed by 180° when seen from the connection direction to crossover each other. Thus, even in a case where the same connector 30 is used at the opposite ends, it is possible to correctly connect external apparatuses. Thus, since it is not necessary to employ different connectors at the opposite ends, it is possible to provide the optical connector module 10 at low cost.

Further, since the plurality of optical fibers 22 is formed in the tape form, the plurality of optical fibers 22 is arranged between the connectors 30 without change in the arrangement sequence. Thus, when the optical connector module 10 is manufactured, it is possible to connect the optical cable 20 according to the arrangement sequence of the optical fiber ribbon 21 as such without consideration of the arrangement sequence of the optical fibers 22 between the connectors 30 at the opposite ends. Accordingly, it is possible to easily manufacture the optical connector module 10, to enhance throughput.

Further, in the present embodiment, with respect to the light receiving elements 36b1 and 36b2 mounted in the first arrangement sequence, the light receiving side metal terminals 63 and 64 are mounted in the second arrangement sequence that is reversed to the first arrangement sequence, and the light receiving side wirings 51a and 52b are wired to crossover each other. As the light receiving side wirings 51a and 51b through which a relatively low electric current flows with respect to the light emitting side wirings 52a and 52b crossover each other, it is possible to reduce mutual crosstalk generated between the light receiving side wirings 51a and 51b.

In the above-described embodiment, an example in which the light emitting side wirings 52a and 52b do not crossover each other and the light receiving side wirings 51a and 51b crossover each other has been described, but the light receiving side wirings 51a and 51b may not crossover each other and the light emitting side wirings 52a and 52b may crossover each other. Further, in the present embodiment, either of the primary wirings 50a that connect the control circuit 35a and the CDR apparatus 35b and the secondary wirings 50b that connect the CDR apparatus 35b and the metal terminals 61 to 64 may be formed to crossover each other.

For example, differently from the above-described embodiment, in the present embodiment, with respect to the light emitting elements 36a1 and 36a2 mounted in the first arrangement sequence, the light emitting side metal terminals 61 and 62 may be mounted in the second arrangement sequence reversed to the first arrangement sequence, and the light emitting side wirings 52a and 52b may be wired to crossover each other. As the light emitting side wirings 52a and 52b through which a relatively high electric current flows with respect to the light receiving side wirings 51a and 51b crossover each other, it is possible to reduce the strength with respect to a signal of noise generated by crossover of the wirings, thereby improving the S/N ratio. In this case, with respect to the light receiving elements 36b1 and 36b2 mounted in the first arrangement sequence, the light receiving side metal terminals 63 and 64 are mounted in the first arrangement sequence, and the light receiving side wirings 51a and 51b are wired in parallel.

Further, in the above-described embodiment, an example in which the metal terminals 61 to 64 are provided on the same surface of the connector substrate 33 using the connector substrate 33 of a single layer has been described, but the invention is not limited thereto.

Figure 5A:
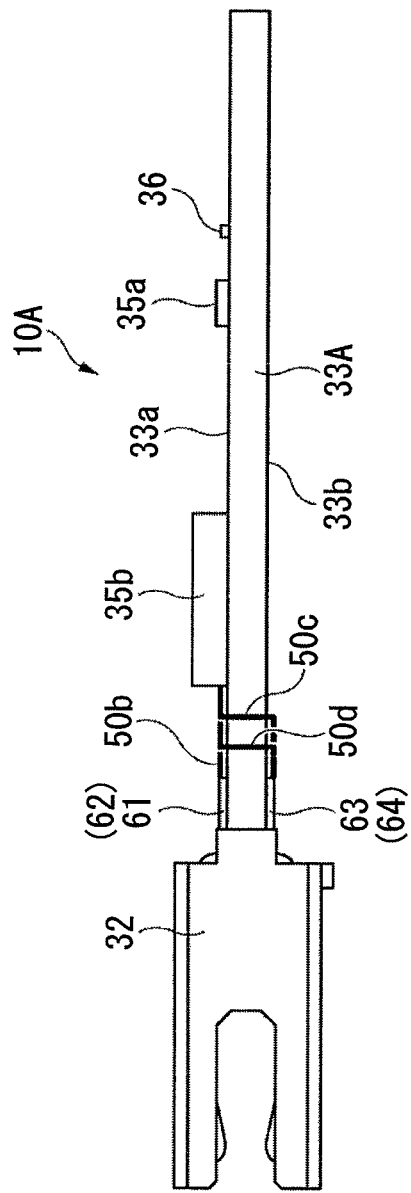
FIG. 5A is a side view illustrating a connector substrate of an optical connector module according to a first modified example of the invention.
Figure 5B:
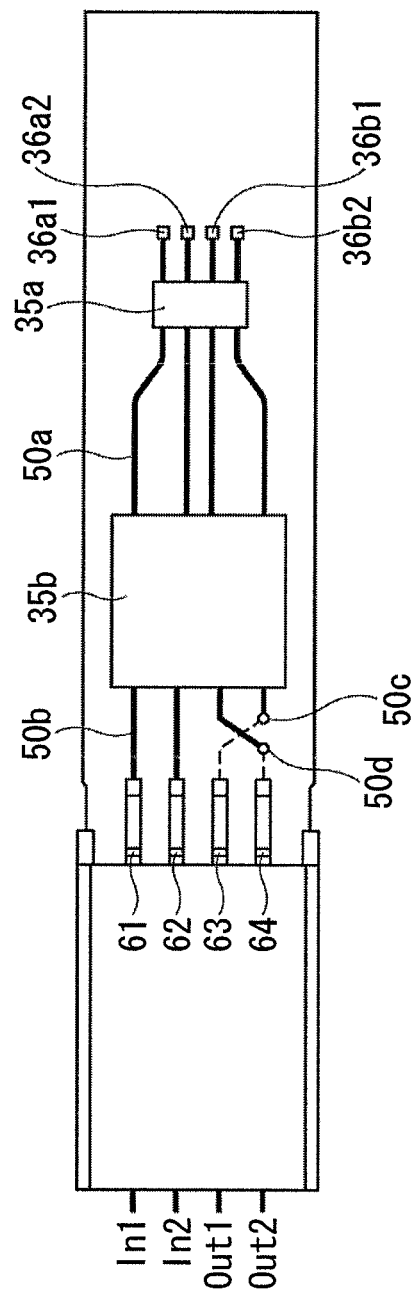
FIG. 5B is a top view thereof.

FIG. 5A is a side view illustrating a connector substrate 33A of an optical connector module 10A according to a first modified example of the invention. FIG. 5B is a top view illustrating the connector substrate 33A shown in FIG. 5A. As shown in FIGS. 5A and 5B, in the optical connector module 10A, the light emitting side metal terminals 61 and 62 are formed on a front surface side of the single connector substrate 33A, and the light receiving side metal terminals 63 and 64 are formed on a rear surface side thereof.

In the optical connector module 10A according to the present modified example, in the secondary wirings 50b that connect the light receiving side metal terminal 63 connected to the first output terminal Out1 of an external apparatus on one side and the light receiving side metal terminal 64 connected to the second output terminal Out2, and the CDR apparatus 35b, crossover is performed using through-electrodes 50c and 50d.

Specifically, the through-electrode 50c in the secondary wiring 50b connected to the light receiving side metal terminal 63 is formed on the side of the CDR apparatus 35b, compared with the through-electrode 50d in the secondary wiring 50b connected to the light receiving side metal terminal 64. Further, the position of the secondary wiring 50b connected to the light receiving side metal terminal 63 is changed on the rear surface of the connector substrate 33A, and the position of the secondary wiring 50b connected to the light receiving side metal terminal 64 is changed on the front surface of the connector substrate 33A. Thus, the positions of the wirings 50b are switched using the front surface and the rear surface of the connector substrate 33A.

Further, in this way, by forming the metal terminals 61 to 64 on the front surface side and the rear surface side of the connector substrate 33A, it is possible to increase the distance between the secondary wirings 50b that extend from the metal terminals 61 to 64. Thus, it is possible to reduce crosstalk between the secondary wirings 50b.

Figure 6:
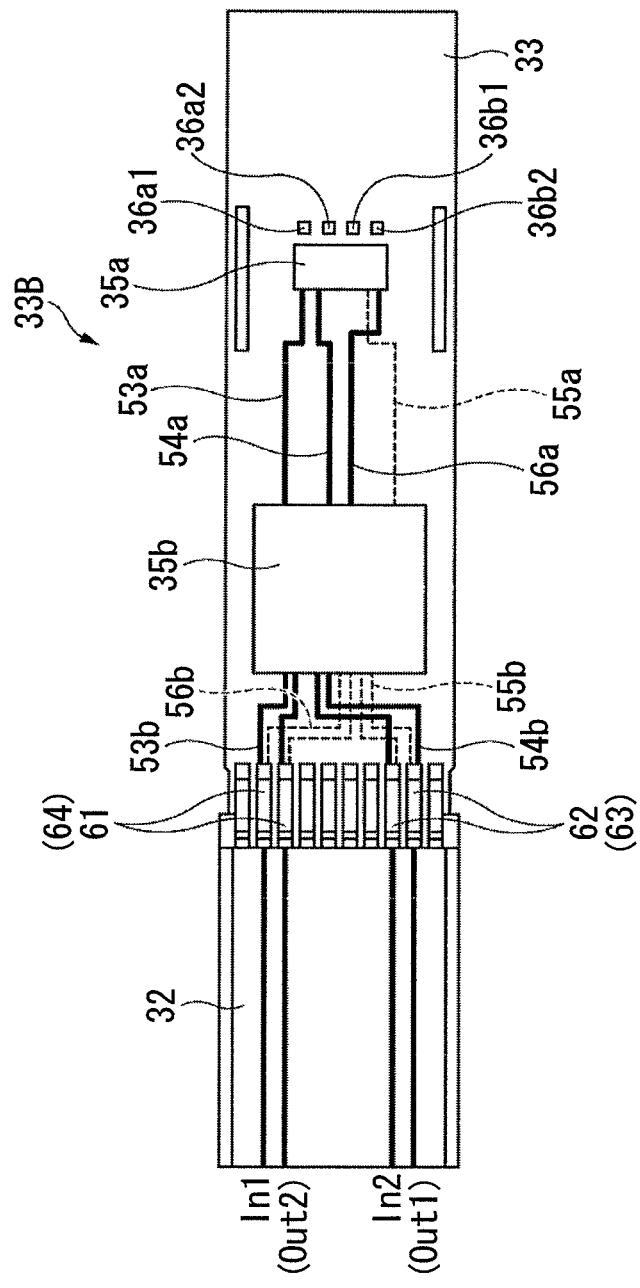
FIG. 6 is a plan view illustrating a connector substrate of an optical connector module according to a second modified example of the invention.
Figure 7A:
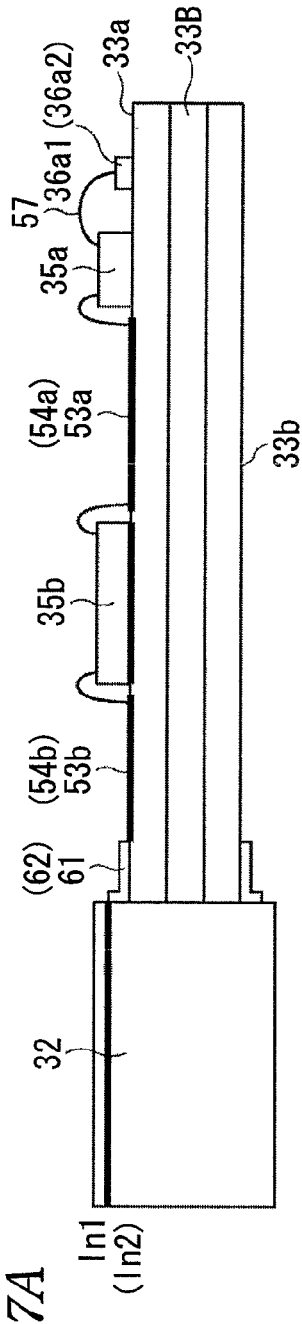
FIGS. 7A to 7C are cross-sectional views illustrating the connector substrate shown in FIG. 6.
Figure 7B:
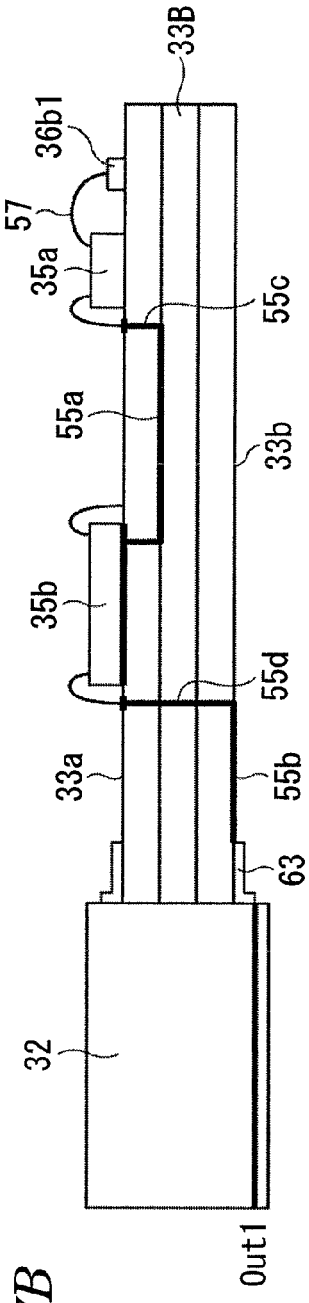
Figure 7C:
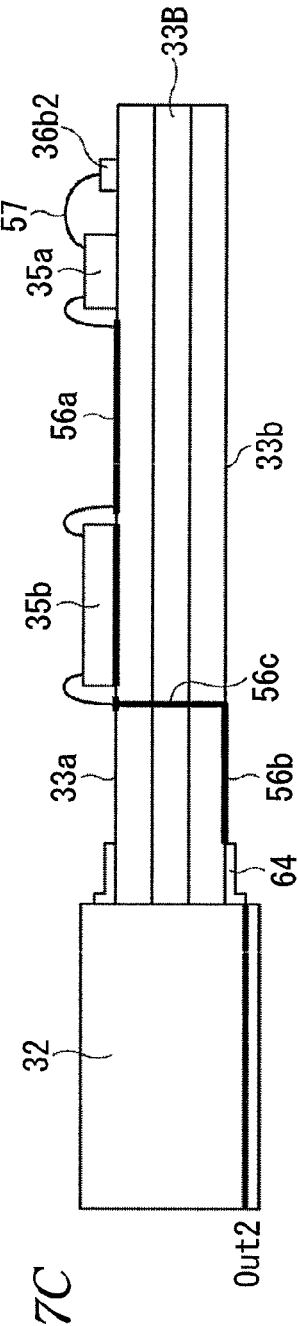

FIG. 6 is a plan view illustrating a connector substrate 33B of an optical connector module according to a second modified example of the invention. FIGS. 7A to 7C are cross-sectional views illustrating the connector substrate 33B shown in FIG. 6.

In the second modified example, as shown in FIG. 6 and FIGS. 7A to 7C, an electrical signal input to the first input terminal In1 of the external apparatus is input to the light emitting element 36a1 through the light emitting side metal terminal 61, a secondary wiring 53b, a CDR apparatus 35a, a primary wiring 53a, and a control circuit 35a. Further, an electrical signal input to the second input terminal In2 is input to the light emitting element 36a2 through the light emitting side metal terminal 62, a secondary wiring 54b, a CDR apparatus 35b, a primary wiring 54a, and the control circuit 35a.

Further, an electrical signal from the light receiving element 36b1 is input to the first output terminal Out1 of the external apparatus through the control circuit 35a, a primary wiring 55a, the CDR apparatus 35b, a secondary wiring 55b, and the light receiving side metal terminal 63. Similarly, an electrical signal from the light receiving element 36b2 is input to the second output terminal Out2 of the external apparatus through the control circuit 35a, a primary wiring 56a, the CDR apparatus 35b, a secondary wiring 56b, and the light receiving side metal terminal 64. Two wirings are formed between the metal terminals 61 to 64 and the CDR apparatus 35b in order to transmit a differential signal. Further, the light receiving and emitting elements 36a1, 36a2, 36b1 and 36b2 and the control circuit 35a are connected to each other by bonding wires 57.

In the present modified example, the connector substrate 33B is formed by a three-layer substrate. The light emitting side metal terminals 61 and 62 are formed on the front surface of the connector substrate 33B, and the light receiving side metal terminals 63 and 64 are formed on the rear surface of the connector substrate 33B.

FIG. 7A is a cross-sectional view of the connector substrate 33B illustrating the primary wiring 53a and the secondary wiring 53b. As shown in FIG. 6 and FIG. 7A, the primary wiring 53a and the secondary wiring 53b that are connected to the first input terminal In1 are formed on the front surface 33a of the connector substrate 33B. Similarly, the primary wiring 54a and the secondary wiring 54b that are connected to the second input terminal In2 are formed on the front surface 33a of the connector substrate 33B. The primary wirings 53a and 54a do not crossover each other, and the secondary wirings 53b and 54b also do not crossover each other.

FIG. 7B is a cross-sectional view of the connector substrate 33B illustrating the primary wiring 55a and the secondary wiring 55b. As shown in FIG. 6 and FIG. 7B, the primary wiring 55a that is connected to the first output terminal Out1 is formed on a layer directly under the front surface 33a through a through-electrode 55c. Further, the secondary wiring 55b that is connected to the first output terminal Out1 is formed on the rear surface 33b of the connector substrate 33B, and is connected to the CDR apparatus 35b through a through-electrode 55d. Thus, the secondary wiring 55b is connected to the light receiving side metal terminal 63 provided on the rear surface 33b.

FIG. 7C is a cross-sectional view of the connector substrate 33B, illustrating the primary wiring 56a and the secondary wiring 56b. As shown in FIG. 6 and FIG. 7C, the primary wiring 56a that is connected to the second output terminal Out2 is formed on the front surface 33a of the connector substrate 33B. Further, the secondary wiring 56b that is connected to the second output terminal Out2 is formed on the rear surface 33b of the connector substrate 33B, and is connected to the CDR apparatus 35b through a through-electrode 56c. Thus, the secondary wiring 56b is connected to the light receiving side metal terminal 64 provided on the rear surface 33b.

In this way, in the present modified example, the primary wirings 55a and 56a are provided to extend over different layers of the connector substrate 33B, and the primary wirings 55a and 56a crossover each other so that their positions are reversed. In this way, by providing the wirings to extend over the different layers, it is possible to easily form a crossover wiring pattern.

Further, in the present modified example, since the primary wirings 55a and 56a are formed to crossover each other, it is possible to effectively use a space on the side of the connector substrate 33 on which the optical fiber 22 is mounted, on which an electronic component and an optical component are integrated. For example, in the case of a configuration in which the lens array component 41 is arranged to cover the control circuit 35a and the light receiving and emitting elements 36a1, 36a2, 36b1, and 36b2, as shown in FIG. 3, it is necessary to secure a region where the lens array component 41 is mounted. In this case, it is necessary to set the primary wirings 55a and 56a to be relatively longer than the secondary wirings 55b and 56b. In this case, by causing the primary wirings 55a and 56a to crossover each other in the region where the primary wirings 55a and 56a are formed, it is not necessary to increase the entire length of the connector substrate 33 for crossover in the secondary wirings 55b and 56b. Thus, it is possible to achieve the connector substrate 33 of a small size.

Further, in the present modified example, the primary wirings 55a and 56a to which signals from the light receiving elements 36b1 and 36b2 before being input to the CDR apparatus 35b are transmitted crossover each other. The signals from the light receiving elements 36b1 and 36b2 before being input to the CDR apparatus 35b are weak, and are easily influenced by mutual crosstalk. Thus, in the present modified example, by forming the primary wirings 55a and 56a on the different layers to crossover each other, it is possible to space the primary wirings 55a and 56a, thereby reducing crosstalk.

Electric current output from the light receiving elements 36b1 and 36b2 is weak compared with electric current input to the light emitting elements 36a1 and 36a2. In the present embodiment, the light receiving side secondary wirings 55a and 56a through which weak electric current output from the light receiving elements 36b1 and 36b2 flows are provided at the spaced layers. Thus, it is possible to further reduce mutual crosstalk of the second wirings 55a and 56a.

Further, in the present modified example, the primary wirings 53a and 54a which transmit signals to the light emitting elements 36b1 and 36b2 after being input to the CDR apparatus 35b may crossover each other. Even if the waveform of the signals input to the electrical input and output section 32 from the external apparatus fluctuates, since the primary wirings 53a and 54a crossover each other after the waveform of the signals is shaped by the CDR apparatus 35b, it is possible to prevent the unexpected crosstalk from occurring between the primary wirings 53a and 54a in the crossover portion.

(Second Embodiment)

Next, an optical connector module of a second embodiment according to the invention will be described with reference to the accompanying drawings. Repetitive description with respect to the portions common to the optical connector module 10 according to the above-described first embodiment will be omitted.

Figure 8:
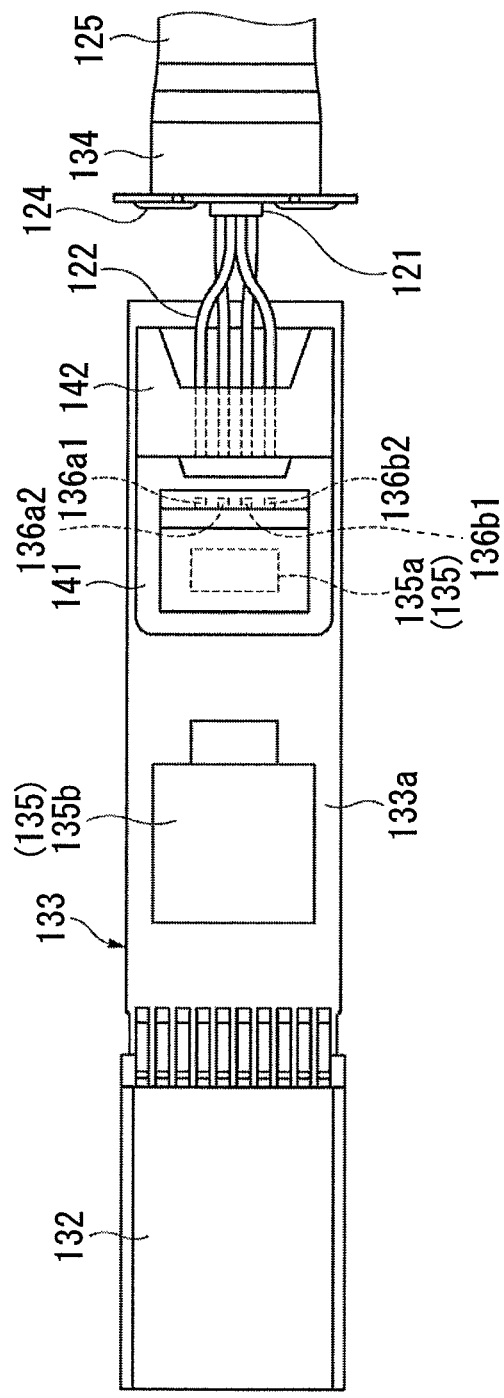
FIG. 8 is a plan view illustrating a connector substrate according to a second embodiment of the invention.
Figure 9:
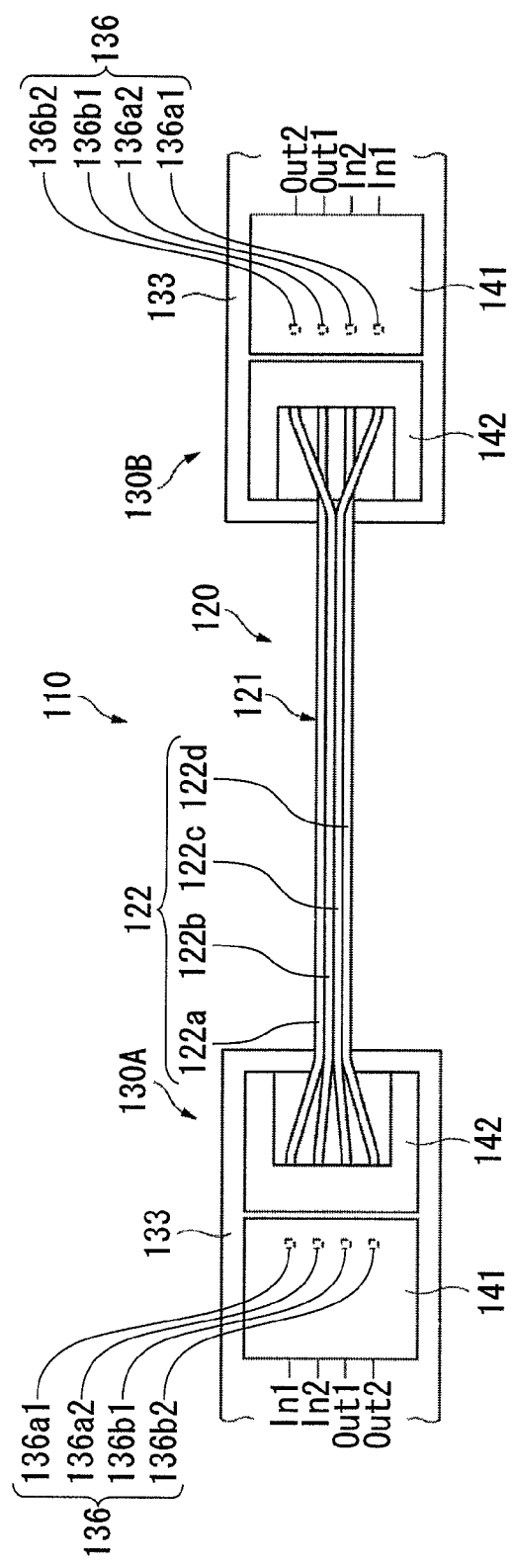
FIG. 9 is a plan view illustrating a part of an optical connector module according to a second embodiment of the invention.

FIG. 8 is a plan view of a connector substrate 133 according to the second embodiment. FIG. 9 is a plan view illustrating a part of an optical connector module 110 according to the second embodiment.

In the above-described first embodiment, a case where the light emitting side wirings or the light receiving side wirings crossover each other has been described as an example, but in the optical connector module according to the second embodiment, as shown in FIGS. 8 and 9, transmission optical fibers 122a and 122b and reception optical fibers 122c and 122d crossover each other.

A connection state of a connector 130 and an optical cable 120 will be described with reference to FIG. 9.

First, connectors of external apparatuses connected to one end and the other end of the optical connector module 110 designed under the same standard, are formed in the same shape. Accordingly, the arrangements of the terminals of the connectors are reversed at opposite ends of the optical connector module 110. Accordingly, in the case of the example shown in the figure, the first input terminal In1, the second input terminal In2, the first output terminal Out1 and the second output terminal Out2 are sequentially arranged from the top on one end side, and the second output terminal Out2, the first output terminal Out1, the second input terminal In2 and the first input terminal In1 are sequentially arranged from the top on the other end side. Further, a signal from the first input terminal In1 is set to be transmitted to the first output terminal Out1, and a signal from the second input terminal In2 is set to be transmitted to the second output terminal Out2.

As shown in FIG. 9, the optical connector module 110 of the present embodiment includes in total four channels of two transmission side channels and two reception side channels according to the external apparatus. The transmission side channels are channels that transmit a signal on one end side to the other end side. The transmission side channels include a first channel and a second channel.

As shown in FIG. 9, in the first channel, an electrical signal is received from the first input terminal In1 on one end side, and is converted into an optical signal in a light emitting element 136a1 of a connector 130A on one end side to be transmitted through the optical fiber 122a. Then, the optical signal is converted into an electrical signal in a light receiving element 136b1 of a connector 130B on the other end side to be output to the first output terminal Out1 on the other end side.

In the second channel, an electrical signal is received from the second input terminal In2 on one end side, and is converted into an optical signal in a light emitting element 136a2 of the connector 130A on one end side to be transmitted through the optical fiber 122b. Then, the optical signal is converted into an electrical signal in a light receiving element 136b2 of the connector 130B on the other end side to be output to the second output terminal Out2 on the other end side.

The reception side channels are channels that receive a signal from the other end side on one end side. The reception side channels include a third channel and a fourth channel.

In the third channel, an electrical signal is received from the first input terminal In1 on the other end side, and is converted into an optical signal in the light emitting element 136a1 of the connector 130B on the other end side to be transmitted through the optical fiber 122c. Then, the optical signal is converted into an electrical signal in the first light receiving element 136b1 on one end side to be output to the first output terminal Out1 on one end side.

In the fourth channel, an electrical signal is received from the second input terminal In2 on the other end side, and is converted into an optical signal by the light emitting element 136a2 of the connector 130B on the other end side to be transmitted through the optical fiber 122d. Then, the optical signal is converted into an electrical signal by the second light receiving element 136b2 on one end side to be output to the second output terminal Out2 on one end side.

However, as shown in FIG. 9, the light emitting elements 136a1 and 136a2 and the light receiving elements 136b1 and 136b2 in a light receiving and emitting element 136 of the connector 130A on one end side are sequentially arranged from the right when seen from the optical cable 120, that is, in the order of the light emitting element 136a1, the light emitting element 136a2, the light receiving element 136b1 and the light receiving element 136b2. Further, in the connector 130B on the other end side, the light emitting elements 136a1 and 136a2 and the light receiving elements 136b1 and 136b2 are sequentially arranged from the right when seen from the side of the optical cable 120, that is, in the order of the light emitting element 136a1, the light emitting element 136a2, the light receiving element 136b1 and the light receiving element 136b2. In this way, the connector 130A on one end side and the connector 130B on the other end side are configured by the same connector, and the connector 130A on one end side and the connector 130B of the other end side are rotationally symmetrical in the horizontal plane.

Further, in an optical fiber ribbon 121, the optical fibers 122a, 122b, 122c and 122d are sequentially aligned in a line. Accordingly, as shown in FIG. 9, in a case where the optical fiber ribbon 121 is disposed so that the optical fibers 122a, 122b, 122c and 122d are sequentially arranged from the right with respect to the connector 130A on one end side, if the plurality of optical fibers 122 are connected to the connector 130B on the other end side in the state of being arranged in parallel, it is difficult to perform connection between external apparatuses as determined. For example, a signal of the first input terminal In1 on one end side is output at the second output terminal Out2 on the other side, and a signal of the second input terminal In2 on one end side is output at the first output terminal Out1 on the other side. That is, the signal from the first input terminal In1 is not transmitted to the first input terminal Out1.

Thus, as shown in FIGS. 8 and 9, the transmission optical fibers 122a and 122b are twisted by 180° when seen from the connection direction between a fixing section 134 and a fiber support section 142 on the other end side, and thus, positions of the optical fiber 122a and the optical fiber 122b are switched.

Similarly, the reception optical fibers 122c and 122d are twisted between the fixing section 134 and the fiber support section 142 on the other end side, and thus, positions of the optical fiber 122c and the optical fiber 122d are switched.

After the positions are switched in this way, in a state where tip ends of the optical fibers 122a to 122d are aligned in a line, the optical fibers 122a to 122d are mounted to the connector substrate 133 through the fiber support section 142.

Accordingly, the optical fibers 122 that are arranged in the order of the optical fibers 122a, 122b, 122c and 122d on one end side are arranged in the order of the optical fibers 122b, 122a, 122d, and 122c on the other end side. Thus, the optical fiber 122a that outputs a signal of the first channel is optically coupled with the light receiving element 136b1 on the other side, the optical fiber 122b that outputs a signal of the second channel is optically coupled with the light receiving element 136b2 on the other side, the optical fiber 122c that outputs a signal of the third channel is optically coupled with the light receiving element 136a1 on the other side, and the optical fiber 122d that outputs a signal of the fourth channel is optically coupled with the light receiving element 136b2 on the other side.

Figure 10:
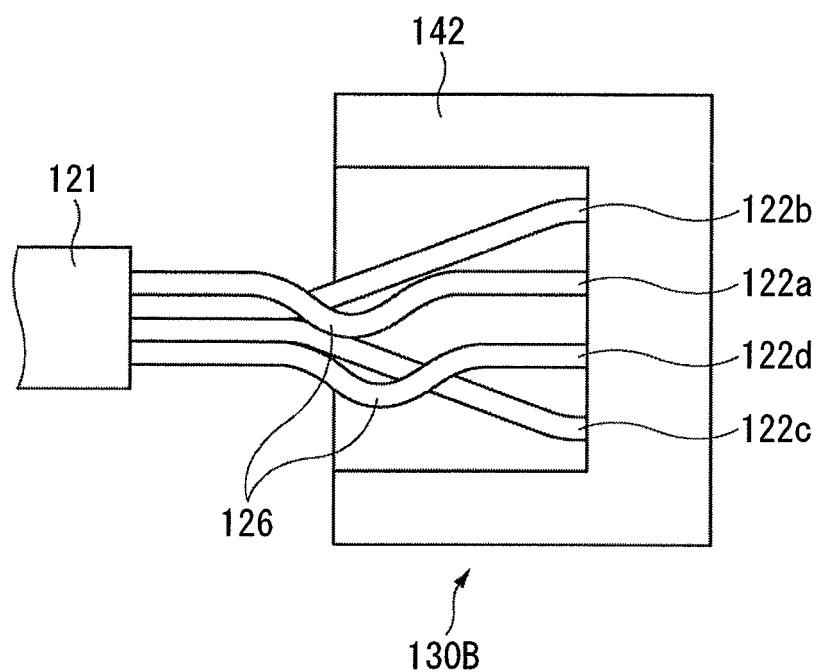
FIG. 10 is a plan view illustrating a twisted state of coated optical fibers.

When the optical fibers 122a to 122d are twisted on the other side, as shown in FIG. 10, the optical fiber 122b that is positioned on the central side in the optical fiber ribbon 121 is twisted outward, and is connected to the light receiving element 136b2. At this time, the optical fiber 122b is wired in parallel.

Further, the optical fiber 122a positioned on the outside of the optical fiber ribbon 121 is twisted inward and is connected to the light receiving element 136b1. Here, the optical fiber 122a is bent when extending over the optical fiber 122b, to thereby form a bending portion 126.

Here, an interval (first pitch) between the optical fibers 122a and 122b in the optical fiber ribbon 121 is narrower than an interval (second pitch) between the optical fibers 122a and 122b in the fiber support section 142. Thus, in a case where both of the optical fibers 122a and 122b are linearly connected toward the fiber support section 142 from the optical fiber ribbon 121 on the other end side, the optical path length of the optical fiber 122b positioned on the outside of the fiber support section 142 is longer than the optical path length of the optical fiber 122a positioned on the inside of the fiber support section 142.

Thus, as shown in FIG. 10, by bending and wiring the optical fiber 122a, the optical fiber 122a is increased in length by the bending amount of the bending section 126, and thus, a length difference between the optical fiber 122b and the optical fiber 122a is reduced. Thus, an optical path length difference between the plurality of optical fibers 122a, 122b, 122c and 122d is reduced, and thus, occurrence of a phenomenon (skew) in which signal arrival timings are different between channels is suppressed. As a result, transmission quality of the optical connector module 110 is improved.

Similarly, the optical fiber 122c positioned on the central side in the optical fiber ribbon 121 is twisted outward and is linearly connected to the light emitting element 136a1. Further, the optical fiber 122d positioned on the outside of the optical fiber ribbon 121 is twisted inward and is bent to be connected to the light emitting element 136a2. Thus, the optical path lengths of the optical fiber 122c and the optical fiber 122d are set to be approximately the same.

Further, in the present embodiment, a region where the optical fibers 122 are aligned with the first pitch and a region where the optical fibers 122 are aligned with the second pitch (region supported by the fiber support section 142) are offset in a direction perpendicular to the arrangement direction of the optical fibers 122, and thus, it is easy to secure an extra length region for twisting the optical fibers as described above.

As described above, according to the optical connector module 110 of the second embodiment, since the transmission optical fibers 122a and 122b and the reception optical fibers 122c and 122d are respectively twisted to be reversed in their arrangement sequences between one end side and the other end side, the arrangement sequence of the transmission optical fibers 122a and 122b and the arrangement sequence of the reception optical fibers 122c and 122d are reversed on one end side and the other end side.

Thus, it is possible to use the same connector substrate 133 at the opposite ends of the optical cable 120, thereby reducing the manufacturing cost. Further, since it is possible to adjust the arrangement sequences of the optical fibers 122 on one end side and the other end side to be the same by a simple technique that the optical fibers 122 are twisted so that the arrangement sequences are reversed, it is easy to assemble the optical connector module 110, and to reduce the manufacturing cost.

Further, since the plurality of transmission optical fibers 122a and 122b and the plurality of reception optical fibers 122c and 122d are bundled as the optical fiber ribbon 121, it is possible to provide the optical connector module 110 having high resistance to lateral pressure.

Further, a configuration is used in which both of the transmission optical fibers 122a and 122b and the reception optical fibers 122c and 122d are twisted on the other end side. Thus, in manufacturing, an operator may twist both of the optical fibers without distinction between the transmission optical fibers 122a and 122b and the reception optical fibers 122c and 122d, which makes the process easy.

(Third Embodiment)

Next, an optical connector module of a third embodiment according to the invention will be described with reference to the accompanying drawings. Repetitive description with respect to the portions common to the optical connector module 110 according to the above-described second embodiment will be omitted.

Figure 11:
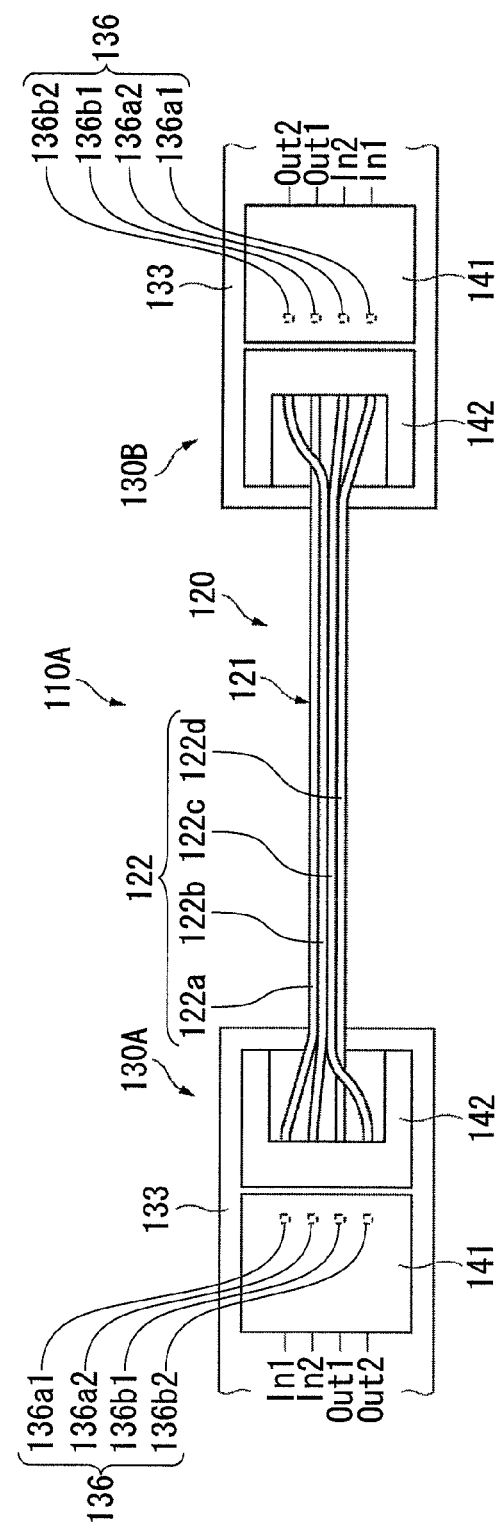
FIG. 11 is a plan view illustrating a part of an optical connector module according to a third embodiment of the invention.

FIG. 11 is a plan view illustrating connection of a light receiving element 136 and optical fibers 122 in an optical connector module 110A according to the third embodiment. As shown in FIG. 11, in the optical connector module 110A according to the third embodiment, the transmission optical fibers 122a and 122b are twisted on the other end side, and the reception optical fibers 122c and 122d are twisted on one end side.

In this way, even though the transmission optical fibers 122a and 122b and the reception optical fibers 122c and 122d are twisted at different locations on one end side and the other end side, it is possible to reverse the arrangement sequence of the transmission optical fibers 122a and 122b and the arrangement sequence of the reception optical fibers 122c and 122d on one end side and the other end side.

Thus, it is possible to use the same connector substrate 133 at the opposite ends of the optical cable 120, thereby reducing the manufacturing cost. Further, it is possible to adjust the arrangement sequences of the optical fibers 122 on one end side and the other end side to be the same by a simple technique that the optical fibers 122 are twisted so that the arrangement sequences are reversed. Thus, it is possible to easily perform assembly of the optical connector module 110, and to reduce the manufacturing cost.

Further, when the optical connector module 110A according to the present embodiment is manufactured, an operator may twist the transmission optical fibers 122 or the reception optical fibers 122 without distinction between one end side and the other end side, which makes the manufacturing process easy. That is, since the optical fibers 122 are twisted at the different locations on one end side and the other end side, when the connector substrate 133 is directed in a predetermined direction, the same side of the transmission optical fibers 122 or the reception optical fibers 122 may be twisted, and thus, it is not necessary for the operator to distinguish between one end side and the other end side.

The optical connector module of the invention is not limited to the above-described embodiments, and appropriate changes, modifications or the like are possible. For example, in the above-described embodiments, a case where the optical cable 20 that includes the optical fiber ribbon 21 having four optical fibers has been described, but the invention may be similarly applied to a case where an optical fiber ribbon having four or more optical fibers is used. Further, a configuration in which an electric wire in addition to the optical fibers is included in the optical cable 20 may be used.

What is claimed is:

1. An optical connector module comprising:
    a pair of connectors including
        a substrate,
        a plurality of light emitting elements adjacently arranged next to one another and a plurality of light receiving elements adjacently arranged next to one another, the plurality of light emitting elements and the plurality of light receiving elements mounted on the substrate,
        a plurality of light emitting side metal terminals adjacently arranged next to one another and a plurality of light receiving side metal terminals adjacently arranged next to one another, the plurality of light emitting side metal terminals and the plurality of light receiving side metal terminals mounted on the substrate and respectively electrically connected to the light emitting elements and the light receiving elements,
        a plurality of light emitting side wirings that connect the light emitting elements and the light emitting side metal terminals one to one, and
        a plurality of light receiving side wirings that connect the light receiving elements and the light receiving side metal terminals one to one; and
    an optical cable including
        a plurality of first optical fibers that optically connect the plurality of light emitting elements of one connector and the plurality of light receiving elements of the other connector, and
        a plurality of second optical fibers that optically connect the plurality of light emitting elements of the other connector and the plurality of light receiving elements of the one connector,
    wherein a plurality of first signal lines formed by the light emitting side wirings of the one connector, the first optical fibers, and the light receiving side wirings of the other connector crossover each other so that an arrangement sequence of the plurality of first signal lines at the light emitting side metal terminals of one connector is reversed to an arrangement sequence of the plurality of first signal lines at the light receiving side metal terminals of the other connector, and
    wherein a plurality of second signal lines formed by the light receiving side wirings of the one connector, the second optical fibers, and the light emitting side wirings of the other connector crossover each other so that an arrangement sequence of the plurality of second signal lines at the light emitting side metal terminals of the other connector is reversed to an arrangement sequence of the plurality of second signal lines at the light receiving side metal terminals of the one connector.

2. The optical connector module according to claim 1,
    wherein the plurality of first signal lines crossover each other between the plurality of light emitting elements of the one connector and the plurality of light emitting side metal terminals of the one connector, or between the plurality of light receiving elements of the other connector and the plurality of light receiving side metal terminals of the other connector.

3. The optical connector module according to claim 2,
    wherein each connector includes:
        a control circuit configured to perform input of an electrical signal output from the light receiving elements and to perform output of an electrical signal input to the light emitting elements, and
        a waveform shaping circuit configured to shape the waveform of electrical signals input and output in the control circuit,
    wherein the light emitting side wirings and the light receiving side wirings include:

primary wirings that electrically connect the control circuit and the waveform shaping circuit, and secondary wirings that connect the waveform shaping circuit, and the light emitting side metal terminals or the light receiving side metal terminals, and wherein the primary wirings crossover each other.

4. The optical connector module according to claim 1, wherein the light emitting side metal terminals and the light receiving side metal terminals are arranged on different surfaces of the substrate.

5. The optical connector module according to claim 2, wherein the substrate includes a plurality of layers, and wherein the light emitting side wirings crossover each other or the light receiving side wirings crossover each other and include through-electrodes formed through the layers, and are provided over different layers.

6. The optical connector module according to claim 1, wherein the plurality of first optical fibers are connected to the connectors in the state of being twisted between the one end side and the other end side thereof so that the arrangement sequence of the plurality of first signal lines at the light emitting side metal terminals of one connector is reversed to the arrangement sequence of the plurality of first signal lines at the light receiving side metal terminals of the other connector, and wherein the plurality of second optical fibers are connected to the connectors in the state of being twisted so that the arrangement sequence of the plurality of second signal lines at the light emitting side metal terminals of the other connector is reversed to the arrangement sequence of the plurality of second signal lines at the light receiving side metal terminals of one connector.

7. The optical connector module according to claim 6, wherein both of the plurality of first optical fibers and the plurality of second optical fibers are twisted on the one end side or wherein the plurality of first optical fibers are twisted on the one end side and the plurality of second optical fibers are twisted on the other end side.

8. The optical connector module according to claim 6, wherein the plurality of first optical fibers and the plurality of second optical fibers are accommodated in the optical cable in the state of being arranged with a first pitch in a predetermined direction and are connected to the connectors in the state of being arranged in parallel with a second pitch wider than the first pitch in the predetermined direction, wherein the plurality of first optical fibers crossover each other and the plurality of second optical fibers crossover each other and are connected to the connectors in a state where a first optical fiber and a second optical fiber positioned at the outermost positions are twisted inward, and have a bending portion formed in a direction perpendicular to the predetermined direction when extending over a first optical fiber and a second optical fiber positioned on the inside.

9. The optical connector module according to claim 8, wherein a region where the optical fibers are arranged with the first pitch and a region where the optical fibers are arranged with the second pitch are offset in the direction perpendicular to the predetermined direction, and the bending portion is formed in the offset direction.

10. The optical connector module according to claim 1, wherein the plurality of second signal lines crossover each other between the plurality of light emitting elements of the other connector and the plurality of light emitting side metal terminals of the other connector, or between the plurality of light receiving elements of the one connector and the plurality of light receiving side metal terminals of the one connector.

11. The optical connector module according to claim 1, wherein the plurality of light emitting side wirings of the one connector crossover each other, the plurality of light receiving side wirings of the one connector are in parallel, the plurality of light emitting side wirings of the other connector crossover each other, and the plurality of light receiving side wirings of the other connector are in parallel.

12. The optical connector module according to claim 1, wherein the plurality of light receiving side wirings of the one connector crossover each other, the plurality of light emitting side wirings of the one connector are in parallel, the plurality of light receiving side wirings of the other connector crossover each other, and the plurality of light emitting side wirings of the other connector are in parallel.

13. The optical connector module according to claim 10, wherein each connector includes:

a control circuit configured to perform input of an electrical signal output from the light receiving elements and to perform output of an electrical signal input to the light emitting elements, and a waveform shaping circuit configured to shape the waveform of electrical signals input and output in the control circuit, wherein the light emitting side wirings and the light receiving side wirings include:

primary wirings that electrically connect the control circuit and the waveform shaping circuit, and secondary wirings that connect the waveform shaping circuit, and the light emitting side metal terminals or the light receiving side metal terminals, and wherein the primary wirings crossover each other.

14. The optical connector module according to claim 11, wherein each connector includes:

a control circuit configured to perform input of an electrical signal output from the light receiving elements and to perform output of an electrical signal input to the light emitting elements, and a waveform shaping circuit configured to shape the waveform of electrical signals input and output in the control circuit, wherein the light emitting side wirings and the light receiving side wirings include:

primary wirings that electrically connect the control circuit and the waveform shaping circuit, and secondary wirings that connect the waveform shaping circuit, and the light emitting side metal terminals or the light receiving side metal terminals, and wherein the primary wirings crossover each other.

15. The optical connector module according to claim 12, wherein each connector includes:

a control circuit configured to perform input of an electrical signal output from the light receiving elements and to perform output of an electrical signal input to the light emitting elements, and a waveform shaping circuit configured to shape the waveform of electrical signals input and output in the control circuit, wherein the light emitting side wirings and the light receiving side wirings include:

primary wirings that electrically connect the control circuit and the waveform shaping circuit, and secondary wirings that connect the waveform shaping circuit, and the light emitting side metal terminals or the light receiving side metal terminals, and wherein the primary wirings crossover each other.

16. The optical connector module according to claim 10, wherein the substrate includes a plurality of layers, and wherein the light emitting side wirings crossover each other or the light receiving side wirings crossover each other and include through-electrodes formed through the layers, and are provided over different layers.

17. The optical connector module according to claim 11, wherein the substrate includes a plurality of layers, and wherein the light emitting side wirings crossover each other or the light receiving side wirings crossover each other and include through-electrodes formed through the layers, and are provided over different layers.

18. The optical connector module according to claim 12, wherein the substrate includes a plurality of layers, and wherein the light emitting side wirings crossover each other or the light receiving side wirings crossover each other and include through-electrodes formed through the layers, and are provided over different layers.

* * * * *